United States Patent [19]
Dunn

[11] 3,818,967
[45] June 25, 1974

[54] TIRE REMOVAL AND MOUNTING TOOL
[76] Inventor: John Karl Dunn, P.O. Box 1593, Sebring, Fla. 33870
[22] Filed: Nov. 9, 1972
[21] Appl. No.: 304,918

[52] U.S. Cl. ............................................. 157/1.22
[51] Int. Cl. ....................... B60c 25/06, B60c 25/04
[58] Field of Search.................. 157/1.17, 1.22, 1.24

[56] References Cited
UNITED STATES PATENTS
2,569,788  10/1951  Weaver ............................. 157/1.24
FOREIGN PATENTS OR APPLICATIONS
593,037   2/1934  Germany .......................... 157/1.22
1,032,406  7/1953  France ............................. 157/1.17

Primary Examiner—Othell M. Simpson
Assistant Examiner—Harold P. Smith, Jr.

[57] ABSTRACT

A tire removal and mounting tool that is particularly adapted for use in removing tires from rims that have no lug holes such as those used on motorcycles. The tool comprises a crank lever fixed to a pinion gear in mesh with a large gear and a pair of arms, driven respectively thereby, each carrying a removable, adjustable tool at its outer end portion for engagement under the bead of a tire to be removed from a rim. Actuation of the crank handle normally moves the arms relative to each other, one clockwisely and the other counter clockwisely, to lift the tire bead out of engagement from within the periphery of the rim or to engage the bead thereunder. The tool is rotatably mounted on any type of spindle, such as the wheel axle, inserted through the center hole in the wheel.

5 Claims, 2 Drawing Figures

PATENTED JUN 25 1974 3,818,967

TIRE REMOVAL AND MOUNTING TOOL

STATE OF THE PRIOR ART

Various types of tire removal tools are, and have been in use for many years in garages, service stations, etc. Most of these tools are particularly adapted for use on automobile wheels which contain a plurality of lug holes. The tools generally provide a spindle for engagement through the center hole in the wheel and a radially offset pin that engages through one of the lug holes to prevent rotation of the wheel when a tire removal tool is passed under the tire bead and rotated about the tire rim to disengage the bead from the rim.

Special tire removal tools are available for motorcycle wheels. These tools generally are of a pedestal type which may be permanently mounted to the floor and include some type of clamp means to hold the wheel against rotation while a single tool is inserted between the tire bead and rim and rotated to disengage the bead from said rim.

By the very nature of these tire removal tools, they are usable only in motorcycle shops or the like. Consequently, when a flat tire occurs when a cyclist is on the road, the tire change must be effected entirely by hand.

BACKGROUND OF THE PRESENT INVENTION

The present invention provides a unique, compact, portable tire removal and mounting tool which is adapted to remove and mount tires on wheel rims which provide no lug holes or the like for engagement by a holding means during the tire removal operation. Therefore, the tool is ideally adapted for the removal and mounting of motorcycle tires and it can be easily carried in a luggage pouch or the like for ready use in an emergency on the road.

When it is necessary to change a motorcycle tire, the axle and wheel assembly is removed. With the device of the present invention, the wheel is laid flat and the axle is passed through the center hole in the wheel. Because of the length of the axle, a portion thereof will project above the wheel to slidably receive a centering sleeve of the removal tool of the present invention. First, however, a pair of normally side-by-side tool heads are inserted between the wheel rim and the tire bead. The sleeve is then slid over the projecting end of the axle and a crank type of lever is manually manipulated to operate a gear drive mechanism to drive a pair of arms, each of which adjustably carries one of the tool end portions.

The arms are normally driven relative to each other, one clockwisely, the other counterclockwisely, through an arc of approximately 180° or slightly more whereupon the tire is easily removed from the wheel rim by hand. Because of the nature of the device, no base support including clamp means is required to stabilize the wheel during the tire removal operation. Substantially balanced, opposite rotational forces are normally imparted to the respective pair of arms and the tool ends travel around the rim to lift the tire bead therefrom. Because of these balanced forces, the device is self-stabilizing, thereby eliminating any tendancy of the wheel to rotate in either direction during the tire removal operation. In operation, the one arm may be held substantially stationary, if desired, to position one tool head as a holding means while all of the rational movement is directed to the other arm to remove the tire bead from the rim. The tire removal tool heads are interchangeable with tire mounting tool heads and the mounting operation is accomplished by reversing the tire removal operation.

While the tool of the present invention is ideally suited for emergency use as above described, it is equally adaptable for shop use with any conventional type of pedestal stand providing a center spindle. For shop use the tool can be powered by an electric or air motor.

DETAILED DESCRIPTION OF THE INVENTION

Figure 1:
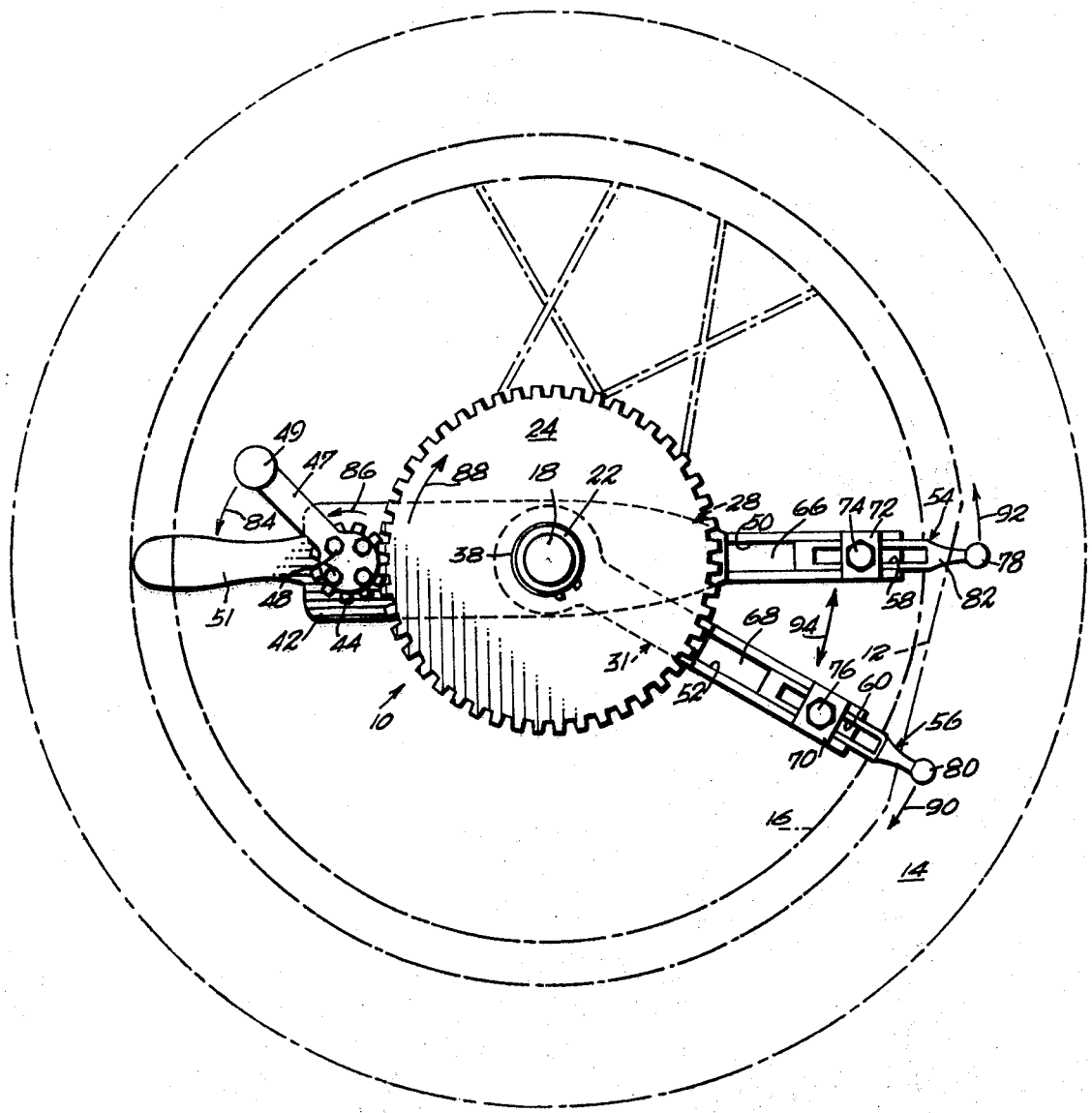
FIG. 1 is a top plan view of the tire removal tool of the present invention in operable engagement between a tire bead and a wheel rim for disengaging the bead from said rim.

With reference to the drawings in which like reference numerals designate like or corresponding parts throughout both views, the numeral 10 generally designates the tire removal and mounting tool of the present invention in operable engagement between the bead 12 of a tire 14 mounted on a wheel rim 16 for the purpose of removing the tire therefrom.

Figure 2:
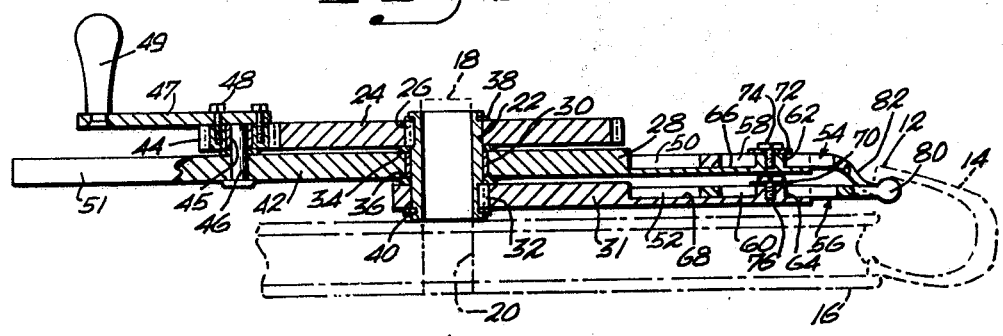
FIG. 2 is a longitudinal, vertical, sectional view through the tool of FIG. 1, both of the arms being shown in section.

In the operation of the tool 10, as illustrated, a center spindle 18, which may be the wheel axle, is slidably engaged through the center hole 20 (FIG. 2) of the wheel. A sleeve 22 of the tire removal tool is slidably engaged over the upwardly projecting portion of the spindle 18 and carries a large gear 24, keyed at 26 to the upper end thereof. Immediately below the large gear 24, a first arm 28 is journaled at 30 about the intermediate portion of the sleeve 22. Below the first arm 28, a second arm 31 is keyed at 32 to the sleeve 22. The large gear 24, first arm 28 and second arm 31 are spaced apart by suitable washer means 34 and 36 and are held in assembly thereon by the split rings 38 and 40.

The first arm 28 includes a radial extension 42, beyond the periphery of the large gear 24, and a pinion gear 44, journaled on a bearing 45 carried by a stub shaft 46, fixed through the extension 42, is in meshing engagement with the large gear 24. A crank lever 47, fixed by any conventional means, such as the bolts 48, to the top side of the pinion gear 44, carries a handle 49 at its outer end. A further extension of 42 in the form of a handle 51 is provided to assist in the operation of the device.

Each of the arms 28 and 31 is grooved at 50 and 52 along its radially extending end portion to slidably receive the tools 54 and 56. In turn, the tools 54 and 56 are slotted at 58 and 60 to slidably engage over center lugs 62 and 64, extending upwardly from the floors 66 and 68 of the respective grooves 50 and 52. Clamp plates 70 and 72 are fixed by bolts 74 and 76 across the top sides of the tools 54 and 56 and arms 28 and 30 to firmly hold said tools in their respective grooves 50 and 52.

The tools 54 and 56 include enlarged distal head portions 78 and 80 which may be generally spherical, as illustrated, or any other desirable configuration to engage between the tire bead 12 and the peripheral lip of the rim 16. The end portion 82 of the tool 54 is turned downwardly to place the enlarged head portions 78 and 80 in a generally side-by-side normal start position, illustrated in FIG. 1. As above described, the slots 58 and 60 and grooves 50 and 52 permit longitudinal adjustment of the tools 54 and 56 relative to the respective arms 28 and 31 to accommodate various rim and tire sizes.

In operation, when it is desirable or necessary to remove a tire from a rim, the wheel is removed from the vehicle in the conventional manner and laid flat. In the case of a motorcycle, the axle is slid into the center hole of the wheel to provide a spindle 18 for the tool 10. After all of the air has been exhausted from the tire, the tool head portions 78 and 80, in a side-by-side disposition, are forced between the tire bead 12 and the peripheral lip of the rim 16. Next, the sleeve 22 is slid over the upwardly projecting portion of the spindle 18 and the crank handle 46 is manually manipulated as indicated in FIG. 1.

As indicated by the arrow 84 in FIG. 1, when the crank lever 46 is turned counterclockwisely, the pinion gear 44 is similarly turned as indicated by the arrow 86. This movement results in a clockwise rotation, indicated at 88, of the large gear 24. Because of the keyed attachment of the large gear 24 and the second or lower arm 31 to the sleeve 22 as previously described, said second arm 31 will then be rotated clockwisely as indicated at 90. The counterclockwise movement of the pinion gear 44, because of its attachment to the upper or first arm 28, would normally impart a counterclockwise movement to said first arm 28, indicated at 92. Therefore, equal and opposite rotational movement would normally be imparted to the two arms 28 and 31. However, due to the manual manipulation of crank lever 46, the arm 28 may be held steady by handle 51 and all of the rotational movement will be imparted to the lower or second arm 31. The end result remains the same, however, and as indicated by the double arrow 94, relative movement between the arms 28 and 31 results in an ever increasing angle of divergence therebetween until said arms are spaced 180° apart. As the arms 28 and 31 move apart, the tire bead 12 is progressively removed from engagement with the peripheral lip of the rim 16 until a point is reached when the tire is easily removed from the rim by hand.

Therefore, the tool of the present invention provides the essential holding means as supplied by one arm while the other arm progressively increases the amount of bead disengagement from the rim. Because of the substantially balanced forces supplied to the two arms 28 and 31, a minimum of effort is required to actuate the device in a relatively short period of time by the manipulation of a single crank lever. No effort is expended in holding the wheel against rotation or in manually maintaining a holding tool in place on one side of the wheel while the tire bead disengagement operation proceeds as is generally the case when a tire removal operation is undertaken along a street or roadside.

The tire removal tool heads 54 and 56 are interchangeable with appropriately shaped tool heads for mounting the tire 14 on the rim 16. The tire removal operation as above described is reversed in the tire mounting operation, that is, a portion of the bead 12 is manually inserted in the rim, the tool heads are positioned in an appropriate spread-apart disposition and the handle lever 47 is manipulated to cause the mounting tool heads to gradually converge, thus urging the entire perimeter of the tire bead 12 into engagement within the rim 16.

For shop use, an electric or air motor may be employed to actuate the arms 28 and 31.

What is claimed is:

1. A tire removal and mounting tool comprising:
   A. a sleeve for sliding engagement over an end portion of a spindle extending outwardly through the center hole in a wheel rim;
   B. a first arm rotatably journaled on said sleeve, extending radially outwardly therefrom and including a first tool head at its outer distal end for engagement with the bead portion of a tire disposed about the wheel;
   C. a second arm fixed to said sleeve, extending radially outwardly therefrom and providing a second tool head at its outer distal end for engagement with the bead portion of a tire to cooperate with said first tool head for removing or mounting the tire relative to the wheel rim;
   D. drive means connecting with said first and second arms to normally drive same relative to each other, one clockwisely and the other counterclockwisely;

each of said tool heads including an inner end portion, slidably engaged in the extended end portion of one of said arms, and clamp means to selectively position said tool head relative to the head of the tire and to effect removal thereof;
   said drive means comprising a large gear fixed to the upper end of said sleeve, said first arm being rotatably journaled between said large gear and said second arm, fixed to the lower end portion of said sleeve, a pinion gear, carried by an extended portion of said first arm, in mesh with said large gear and power means engaged with said pinion gear whereby said first arm may be held against rotational movement to position said first tool head as a holding means while the rotational movement imparted to said large gear by said power means and pinion gear is imparted to said second arm to progressively disengage the bead from the rim to remove the tire therefrom or to engage the bead in the rim to mount the tire thereon.

2. A tire removal and mounting tool as defined in claim 1 wherein each of said first and second tool heads are interchangeable with at least a second set of first and second tool heads having a different configuration.

3. A tire removal and mounting tool as defined in claim 1 wherein said power means comprises a manually operated crank lever.

4. A tire removal and mounting tool as defined in claim 1 wherein said power means comprises a motor.

5. A tire removal and mounting tool as defined in claim 1 including a radially extending handle from said extended portion.

* * * * *